No. 647,368. Patented Apr. 10, 1900.
A. D. BLOCH.
VEHICLE AXLE BEARING.
(Application filed Oct. 26, 1899.)
(No Model.)
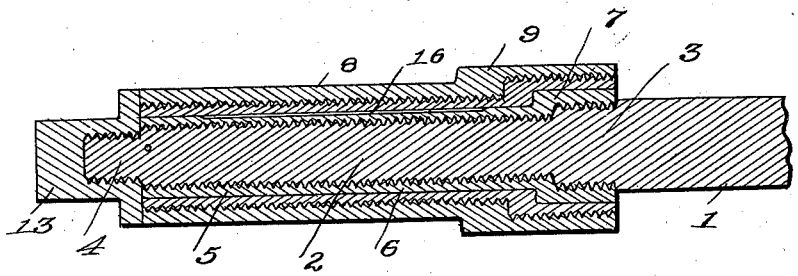
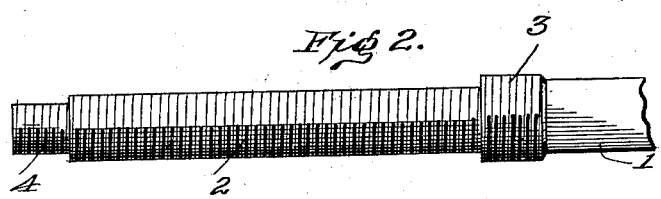
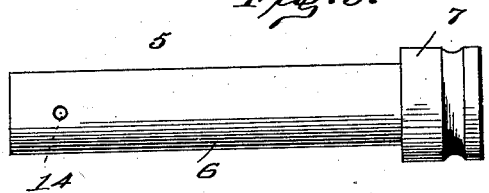
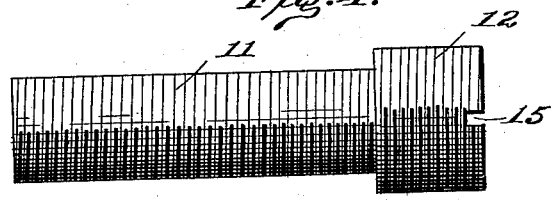
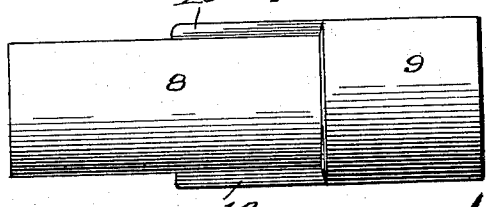
Witnesses:
Inventor
Adolph D. Bloch
By James L. Norris
Attorney

UNITED STATES PATENT OFFICE.

ADOLPH D. BLOCH, OF MOBILE, ALABAMA.

VEHICLE-AXLE BEARING.

SPECIFICATION forming part of Letters Patent No. 647,368, dated April 10, 1900.

Application filed October 26, 1899. Serial No. 734,879. (No model.)

*To all whom it may concern:*

Be it known that I, ADOLPH D. BLOCH, a citizen of the United States, residing at Mobile, in the county of Mobile and State of Alabama, have invented new and useful Improvements in Vehicle-Axle Bearings, of which the following is a specification.

This invention relates to vehicle-axle bearings, and has for its object to provide the axle-spindle with an improved removable sleeve and the axle-box with an improved removable bushing and to secure said sleeve and bushing in place in a novel manner, whereby they are firmly and tightly attached, respectively, to the axle spindle and box in such manner that there cannot possibly occur any rattling or loosening of the connected parts, the construction being such that the sleeve and bushing when worn can be easily and quickly removed by an unskilled person without the aid of special tools and as readily replaced by new sleeves and bushings.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a central longitudinal sectional view of my improved device, the parts being shown assembled together in operative position. Fig. 2 is a detail view of the axle-spindle. Fig. 3 is a similar view of the sleeve. Fig. 4 is a similar view of the bushing, and Fig. 5 is a similar view of the axle-box.

Referring to the drawings, the numeral 1 indicates a metallic axle reduced at its end to form a spindle 2. The end of the axle next adjacent to the spindle is formed with an annular collar 3. The spindle 2 is continuously threaded from end to end, as shown, and the collar 3 is similarly threaded, the threads on the spindle and collar being of the same pitch. The outer end of the spindle is reduced and threaded to form a support 4 for the axle-nut hereinafter referred to.

The numeral 5 indicates a sleeve consisting of a relatively-thin metallic cylindrical shell 6 of approximately the same length as the spindle 2 and provided at its inner end with an enlarged cylindrical portion 7. The sleeve is continuously threaded internally, as shown, both the shell 6 and its enlargement being threaded from end to end and said screw-threads corresponding to the screw-threads on the spindle and its collar. The relative proportions of the spindle and its sleeve are such that when the sleeve is screwed upon the spindle it will completely cover the latter and be tightly fitted thereon at every point throughout its length, the two forming practically a solid spindle. The enlargement 7 in similar manner engages the collar 3. In this manner a very close and firm union between the spindle and sleeve is effected, the continuous threads not only offering a positively-certain resistance against any accidental displacement of the parts, but rendering it impossible that a greater torsional strain should affect one part of the sleeve than another, as would be apt to be the case if only portions of the spindle and sleeve were screw-threaded. The outside of the sleeve should in practice be turned perfectly smooth and true.

Adapted to be inserted in an ordinary wheel-hub is an axle-box consisting of a cylindrical shell 8, provided at its inner end with a cylindrical enlargement 9, longitudinal ribs or feathers 10 being formed on the periphery of the box, whereby when the box is driven into a vehicle-hub it will be tightly held against turning therein. The box is internally screw-threaded continuously from end to end, as shown, said threads being formed in the interior of both the shell 8 and its cylindrical enlargement 9. Adapted to be inserted in the box is a bushing consisting of a cylindrical shell 11, provided at its inner end with a correspondingly-shaped enlargement 12, said bushing being externally screw-threaded continuously, the screw-threads being formed on the exterior of both the shell 11 and its enlargement 12. The box and its bushing are so proportioned that when the bushing is screwed into the box it will completely line every portion of the latter, and the continuous screw-threads will form a firm and efficient means of connection between the two, will effectually prevent any rattling or uneven wearing of the parts, and will also prevent any unequal torsional strains being exerted on the bushing precisely in the same manner that similar results are accomplished with respect to the spindle and its sleeve before described. The interior of the bushing should in practice be finished off smooth and true to accurately fit the exterior of the sleeve 5.

After the parts have been assembled together in the manner above described it is only necessary to slip the bushing upon the sleeve and then screw a nut 13 over the reduced and threaded end 4 of the spindle to secure the vehicle-wheel in place on the axle.

It will be evident that all the friction and wear will be on the sleeve and bushing, there being none whatever on either the spindle or box. Hence the latter will last indefinitely and will never need renewing or repairing. When the sleeve and bushing become worn and unfit or undesirable for further use, it is only necessary to remove the vehicle-wheel from the axle and then unscrew the sleeve from the spindle and the bushing from the box and screw in their places a new sleeve and bushing, the entire operation requiring but a few minutes of time and no skilled labor. To facilitate such operation, I form a perforation 14 in the sleeve, in which may be inserted the end of a spanner-wrench, by which the sleeve may be screwed on and off the spindle, and in the opposite edges of the inner end of the bushing I form two notches or slots 15, in which a key may be inserted to screw the bushing in and out of the box.

In practice the screw-threads will be formed right-handed, so that the tendency of the wheel in use will be to keep the parts screwed up to their places, thus relieving the axle-nuts of strain. It will be apparent that the smooth engaging surfaces of the sleeve and bushing may be tapered off at any desired bevel or inclination.

The sleeve or bushing, as well as the axle and box, can be made any desired length, size, shape, and pitch and can be made with single or double collars, and the invention can be applied to any make of axle.

The axle-sleeve 5 is preferably provided with a shallow longitudinal groove 16, which operates to collect and hold the lubricant employed for lubricating said sleeve and the bushing.

Having described my invention, what I claim is—

1. The combination with an axle-spindle provided at its inner end with an integral cylindrical enlargement, said spindle and enlargement being continuously threaded from end to end externally, of an axle-sleeve provided at its inner end with a cylindrical enlargement, said sleeve and enlargement being continuously threaded from end to end internally and made perfectly smooth externally, the sleeve being constructed to screw over the spindle and be secured thereto at every point, substantially as described and for the purpose specified.

2. The combination with an axle-box having a cylindrical enlargement at one end and provided externally with means for securing the box in a hub, said box and its enlargement being correspondingly threaded from end to end internally, of a bushing provided with a cylindrical enlargement at its inner end, said bushing and its enlargement being correspondingly threaded from end to end externally and made perfectly smooth internally, the bushing being constructed to screw into the box and be secured thereto at every point, substantially as described.

In testimony whereof I have hereunto set my hand in presence of two subscribing witnesses.

ADOLPH D. BLOCH.

Witnesses:
OSCAR K. HEWITT,
WILLARD H. ANDREWS, Jr.